(12) United States Patent  
Park

(10) Patent No.: US 11,843,821 B2
(45) Date of Patent: Dec. 12, 2023

(54) METHOD, APPARATUS, AND NON-TRANSITORY COMPUTER-READABLE RECORD MEDIUM FOR PROVIDING ADDITIONAL INFORMATION ON CONTENTS

(71) Applicant: LINE Plus Corporation, Seongnam-si (KR)

(72) Inventor: Eunae Park, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/158,447

(22) Filed: Jan. 26, 2021

(65) Prior Publication Data

US 2021/0235150 A1  Jul. 29, 2021

(30) Foreign Application Priority Data

Jan. 28, 2020 (KR) .................. 10-2020-0009787

(51) Int. Cl.
```
H04N 21/431    (2011.01)
H04N 21/845    (2011.01)
H04N 21/442    (2011.01)
H04N 21/45     (2011.01)
H04N 21/478    (2011.01)
H04N 21/81     (2011.01)
```
(52) U.S. Cl.
CPC ... *H04N 21/4316* (2013.01); *H04N 21/44218* (2013.01); *H04N 21/4532* (2013.01); *H04N 21/47815* (2013.01); *H04N 21/812* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 2006/0225096 A1* | 10/2006 | Walker | ............... | G06Q 30/0613 705/26.1 |
| 2009/0276805 A1* | 11/2009 | Andrews, II | ....... | H04N 21/2547 725/38 |
| 2011/0162002 A1* | 6/2011 | Jones | ................... | H04N 21/812 725/32 |
| 2013/0014155 A1* | 1/2013 | Clarke | ................ | G11B 27/105 725/32 |

(Continued)

FOREIGN PATENT DOCUMENTS

KR    10-2000-0012639 A    3/2000

*Primary Examiner* — Alexander Q Huerta
(74) *Attorney, Agent, or Firm* — Harness, Dickey & Pierce, P.L.C.

(57) ABSTRACT

Disclosed is a method, apparatus, and non-transitory computer-readable record medium for providing additional information on content. An additional information providing method includes recognizing, by processing circuitry, a plurality of persons in a frame of a video during playback of the video, determining, by the processing circuitry, a user likeability of the plurality of persons, recognizing, by the processing circuitry, an object associated with a specific person among the plurality of persons based on the user likeability, the object being in the frame, and generating, by the processing circuitry, a screen containing additional information corresponding to the object.

18 Claims, 14 Drawing Sheets

(56) References Cited

U.S. PATENT DOCUMENTS

| | | | |
|---|---|---|---|
| 2013/0347018 A1* | 12/2013 | Limp | H04N 21/4394 |
| | | | 725/19 |
| 2014/0379469 A1* | 12/2014 | Cipolletta | H04N 21/812 |
| | | | 705/14.53 |
| 2016/0182954 A1* | 6/2016 | Nguyen | H04N 21/4532 |
| | | | 725/10 |
| 2018/0310071 A1* | 10/2018 | Panchaksharaiah | G06F 16/74 |
| 2019/0166397 A1* | 5/2019 | Li | G06K 9/6201 |
| 2019/0289359 A1* | 9/2019 | Sekar | H04N 21/4316 |
| 2020/0058043 A1* | 2/2020 | Wheatley | H04L 12/1859 |
| 2020/0134320 A1* | 4/2020 | Crossley | G06V 20/20 |

* cited by examiner

FIG. 6

| Person(610) | Timestamp(620) |
|---|---|
| Person A | T1 |
|  | ... |
| Person B | T2 |
|  | ... |
| ... | ... |

FIG. 8

| Object(830) | Timestamp(840) |
|---|---|
| Object a | T1 |
| | ... |
| Object b | T1 |
| | ... |
| ... | ... |

FIG. 9

| Person(610) | Timestamp(620) | Object(830) |
|---|---|---|
| Person A | T1 | Object a<br>Object b |
| | ... | ... |
| Person B | T2 | Object c |
| | ... | ... |
| ... | ... | ... |

— METHOD, APPARATUS, AND NON-TRANSITORY COMPUTER-READABLE RECORD MEDIUM FOR PROVIDING ADDITIONAL INFORMATION ON CONTENTS

CROSS-REFERENCE TO RELATED APPLICATION(S)

This U.S. non-provisional application and claims the benefit of priority under 35 U.S.C. § 119 to Korean Patent Application No. 10-2020-0009787, filed Jan. 28, 2020, the entire contents of which are incorporated herein by reference in their entirety.

TECHNICAL FIELD

At least one example embodiment relates to technology for providing additional information during a video playback.

RELATED ART

In the current times, a product placement (PPL) advertisement for a product appearing in a video is becoming a general advertising method. However, the PPL advertisement is unilaterally provided and thus, has some limitations in satisfying a user's desire to acquire information on a desired product.

As an example of existing technology for solving the above issue, a system that may actively provide information on a product desired by a user among various types of products appearing in a video while viewing the video, for example, a movie, a drama, a music video, and communicative film (CF), on the Internet.

In the related art, there is a method of pre-registering a timestamp in which a product appears in a video or a product tag and popping up information on the product based on a product appearance time or the product tag through a separate tool.

SUMMARY

According to at least one example embodiment, it is possible to automatically record a timestamp in which a person and an object appear using person recognition technology and object recognition technology during a video playback.

Also, according to at least one example embodiment, it is possible to provide a timestamp tag associated with a person and an object in a video player.

Also, according to at least one example embodiment, it is possible to provide additional information based on a person and an object recognized in a frame corresponding to a specific timestamp during a video playback.

According to an aspect of at least one example embodiment, there is provided an additional information providing method performed by a computer apparatus including processing circuitry, the additional information providing method including recognizing, by the processing circuitry, a plurality of persons in a frame of a video during playback of the video, determining, by the processing circuitry, a user likeability of the plurality of persons, recognizing, by the processing circuitry, an object associated with a specific person among the plurality of persons based on the user likeability, the object being in the frame, and generating, by the processing circuitry, a screen containing additional information corresponding to the object.

The recognizing of the persons may include setting a candidate area in the frame, and recognizing the plurality of persons in the candidate area.

The recognizing of the persons may include creating a timestamp tag including storing a timestamp corresponding to a time in which each respective person among the plurality of persons appears.

The recognizing of the object in the video frame may include setting a candidate area in the frame, and recognizing the object in the candidate area.

The recognizing of the object in the video frame may include specifying at least one person among the plurality of persons based on the user likeability, and recognizing the object associated with the at least one person.

The additional information providing method may include recognizing a plurality of objects associated with the specific person based on the user likeability, the object being one of the plurality of objects, and the recognizing the plurality of objects may include creating a timestamp tag including storing a timestamp corresponding to a time in which each respective object among the plurality of objects appears.

The determining of the user likeability may include determining the user likeability based on profile information of a user of the computer apparatus.

The determining of the user likeability may include determining the user likeability based on history information of a user of the computer apparatus, the history information indicating an expressed interest in a particular person.

The additional information may be included in the screen in association with a portion of the frame containing the object.

The object may appear in a plurality of frames of the video, the plurality of frames including a first frame, a last frame and the frame, and the additional information providing method may include outputting the screen at a point in time at which the first frame or the last frame is displayed.

The object may appear in a plurality of frames of the video, the plurality of frames including the frame, and the additional information providing method may include outputting the screen at a point in time at which a frame of the video preceding the plurality of frames is displayed.

The additional information providing method may include recognizing a plurality of objects associated with the plurality of persons based on the user likeability, the object being one of the plurality of objects, and the additional information may include a list of the plurality of persons and a list of the plurality of objects, each object in the list of the plurality of objects appearing in the frame with a corresponding person in the list of the plurality of persons.

The additional information may include shopping information of a product that is matched to the object, the screen includes the additional information on the object, and the object appears with the specific person.

According to an aspect of at least one example embodiment, there is provided a non-transitory computer-readable record medium storing instructions that, when executed by processing circuitry, cause the processing circuitry to perform the additional information providing method.

According to an aspect of at least one example embodiment, there is provided a computer apparatus including processing circuitry. The processing circuitry is configured to cause the computer apparatus to recognize a plurality of persons in a frame of a video during playback of the video, determine a user likeability of the plurality of persons, recognize an object associated with a specific person among the plurality of persons based on the user likeability, the object being in the frame, and generate a screen containing additional information corresponding to the object.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 6 illustrates an example of describing a timestamp tag according to a person recognition according to at least one example embodiment;

FIGS. 8 and 9 illustrate examples of describing a timestamp tag according to an object recognition according to at least one example embodiment.

DETAILED DESCRIPTION

Figure 1:
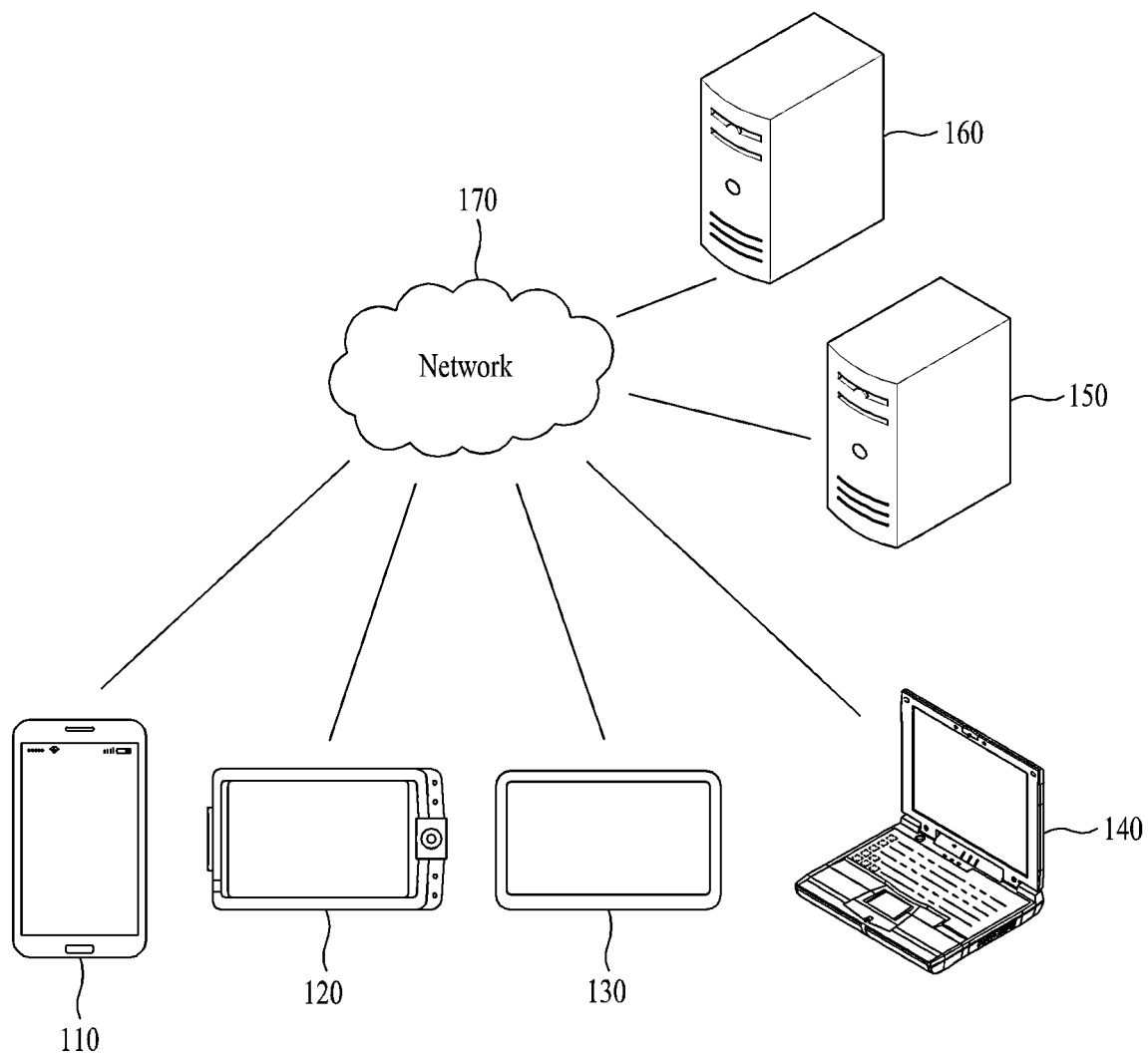
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

At least one example embodiment relates to technology for providing additional information during a video playback.

At least one example embodiment described herein may automatically record a timestamp in which a person and an object appear and may provide additional information based on the person and the object that appear in a specific timestamp using person recognition technology and object recognition technology during a video playback.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer system. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a video service) intended (e.g., requested) by an application, the application may be a computer program installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
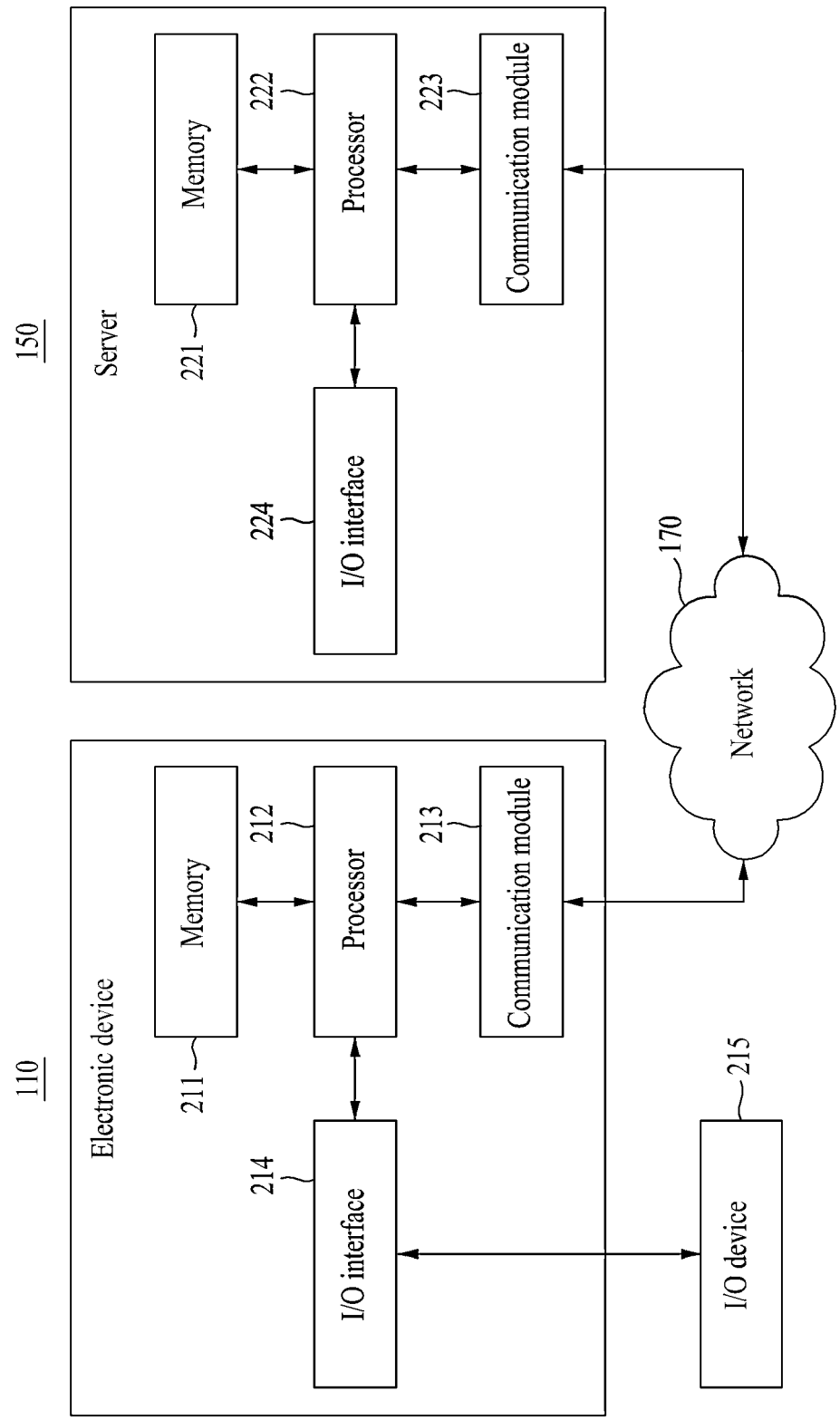
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and/or 140, and/or the server 160, may have the same or a similar configuration as that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224.

The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, a SSD, flash memory, and/or disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110, and/or the server 150, and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215 (e.g., an input device and/or an output device). For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to at least one example embodiment, the electronic device 110 and the server 150 may include a number of components greater than or less than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, at least one example embodiment of a method and system for storing a timestamp in association with a recognized person and/or object according to person and object recognition and providing additional information using the same are described.

Figure 3:
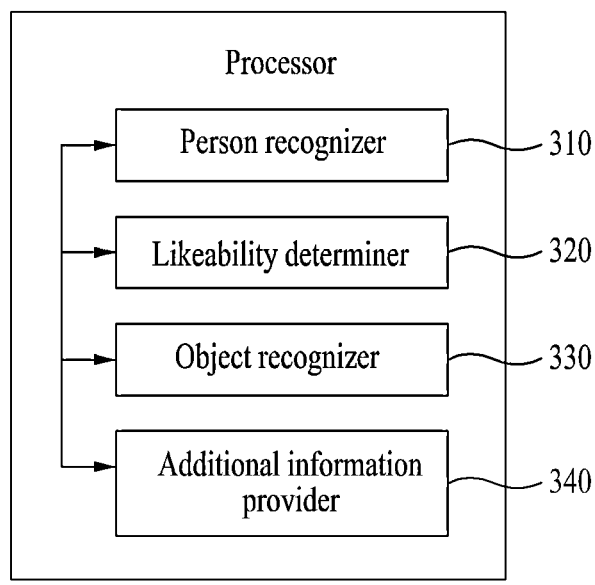
FIG. 3 is a diagram illustrating an example of components includable in a processor of an electronic device according to at least one example embodiment.
Figure 4:
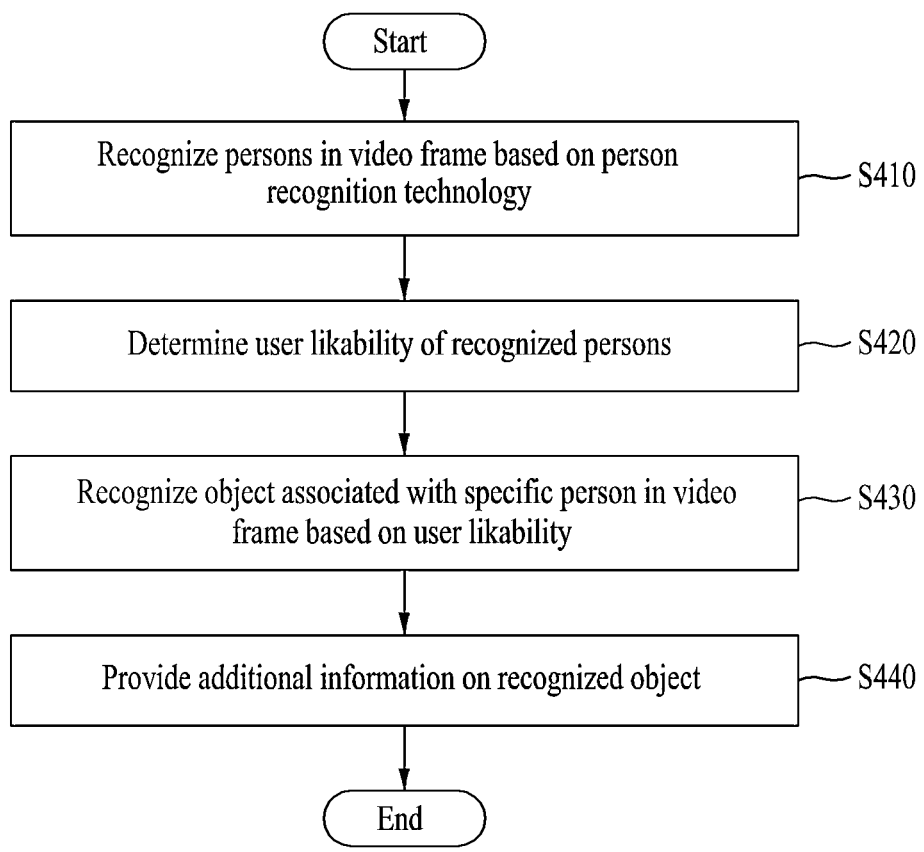
FIG. 4 is a flowchart illustrating an example of an additional information providing method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

An additional information providing system implemented as a computer may be configured in the electronic device 110 according to at least one example embodiment. For example, the additional information providing system may be configured in the form of an independently operating program or may be configured in an in-app form of a specific application to be operable on the specific application. Depending on at least one example embodiment, additional information may be provided through interaction with the server 150. For example, the additional information providing system may be configured in an in-app form of a video player installed on the electronic device 110, and may provide additional information based on a timestamp according to a person recognition or an object recognition in the video player.

The additional information providing system configured in the electronic device 110 may perform the additional information providing method of FIG. 4 in response to an instruction provided from an application installed on the electronic device 110. Referring to FIG. 3, to perform the additional information providing method of FIG. 4, the processor 212 of the electronic device 110 may include a person recognizer 310, a likeability determiner 320, an object recognizer 330, and/or an additional information provider 340. Depending on at least one example embodiment, the components of the processor 212 may be selectively included in or excluded from the processor 212. Also, depending on at least one example embodiment, the components of the processor 212 may be separated or merged for representations of functions of the processor 212.

The processor 212 may read an instruction from the memory 211 to which instructions associated with control of the electronic device 110 are loaded. In this case, the read instruction may include an instruction for controlling the processor 212 to perform the additional information providing method of FIG. 4.

The processor 212 and the components of the processor 212 may control the electronic device 110 to perform operations 5410 to 5440 included in the additional information providing method of FIG. 4. For example, the processor 212 and the components of the processor 212 may be configured to execute an instruction according to a code of at least one program, and/or a code of an OS, included in the memory 211.

Here, the components of the processor 212 may be representations of different functions of the processor 212 performed by the processor 212 in response to an instruction provided from the program code stored in the electronic device 110, for example, an instruction provided from the application executed on the electronic device 110. For example, the person recognizer 310 may be used as a functional representation of the processor 212 that controls the electronic device 110 to recognize a person in a video frame in response to the instruction.

Figure 5:
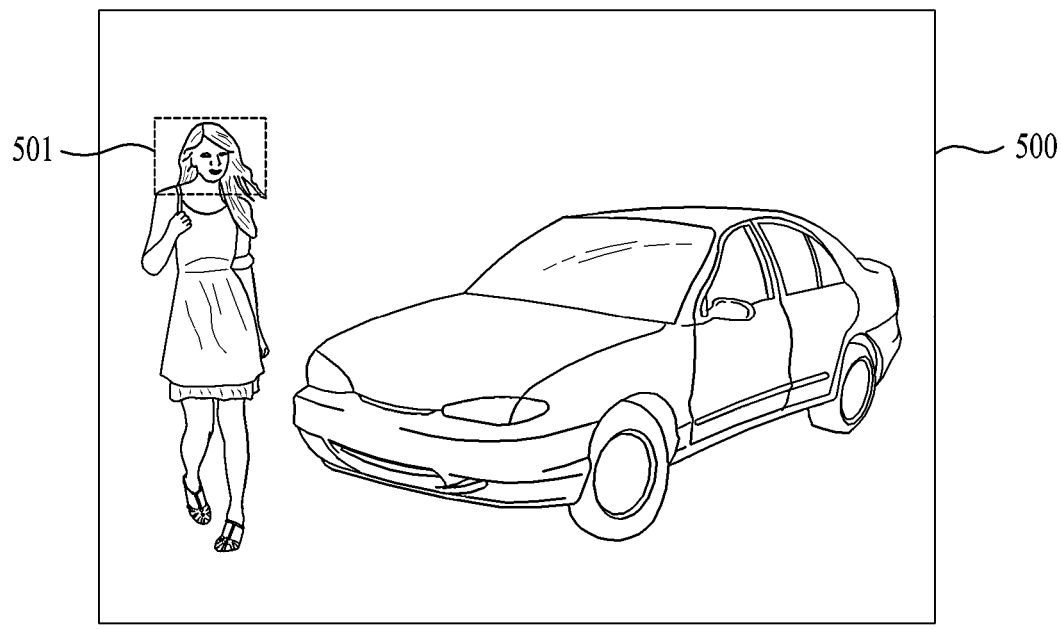
FIG. 5 illustrates an example of describing a person recognition process according to at least one example embodiment.

Referring to FIG. 4, in operation 5410, the person recognizer 310 may recognize persons in a corresponding video frame for each video frame based on person recognition technology (e.g., facial recognition). According to at least one example embodiment, the person recognizer 310 may recognize a plurality of persons in a frame of a video during playback of the video by a video player. Referring to FIG. 5, the person recognizer 310 may set a person candidate area 501 in a video frame 500 based on a facial recognition and may recognize a specific person in the person candidate area 501. The person recognizer 310 may track a change in a location of the specific person based on a similarity of feature information, such as, for example, a size, a color, a shape, and/or an outline between persons recognized in a series of video frames based on object tracking technology. A person recognition method may use at least one of an object recognition algorithm and/or an object tracking algorithm that are widely known.

In particular, the person recognizer 310 may automatically create a timestamp tag according to a person recognition by storing a timestamp of a video frame in which a corresponding person appears for each person recognized through the person recognition. According to at least one example embodiment, each timestamp may correspond to a time and/or duration (e.g., corresponding to a plurality of frames) in which a recognized person appears in the video. The timestamp tag may associate the timestamp with the recognized person. The person recognizer 310 may include one or more timestamp tags in a recognized person table stored on the electronic device 110 (see, e.g., FIG. 6). The person recognizer 310 may analyze at least one video frame included in a video and may store a corresponding person in association with each timestamp. Referring to FIG. 6, the person recognizer 310 may store a timestamp 620 in which a corresponding person 610 appears for each person 610 recognized in a video frame. As another example, the person recognizer 310 may specify and store the person 610 that appears in the video frame at a corresponding point in time for each timestamp 620. Therefore, the person recognizer 310 may automatically create a timestamp tag according to a person recognition using person recognition technology instead of specifying a time at which a specific person is displayed through a separate tool.

Referring again to FIG. 4, in operation 5420, the likeability determiner 320 may determine a user likeability of the electronic device 110 on the persons recognized in operation 5410. For example, the likeability determiner 320 may determine the user likeability based on profile information, for example, a gender, an age, a region (e.g., a geographic region), etc., of the user of the electronic device 110. As another example, the likeability determiner 320 may determine the user likeability based on history information (e.g., previous videos viewed in which a specific person appears) in which the user of the electronic device 110 expresses interest in a corresponding person. Here, the history information may be extracted from information stored in a local storage (e.g., memory) and/or application of the electronic device 110, for example, a video player installed on the electronic device 110, or may be extracted from interest information of the user on the Internet through interaction with the server 150. For example, the user of the electronic device 110 may determine a user likeability on a corresponding person based on a preview view history, or a previous view history, of the user of the electronic device 110 on a corresponding video, for example, a ratio of videos in which a specific person appears among videos previously viewed by the user or a history that the corresponding person is registered as a preferred or liked person.

Figure 7:
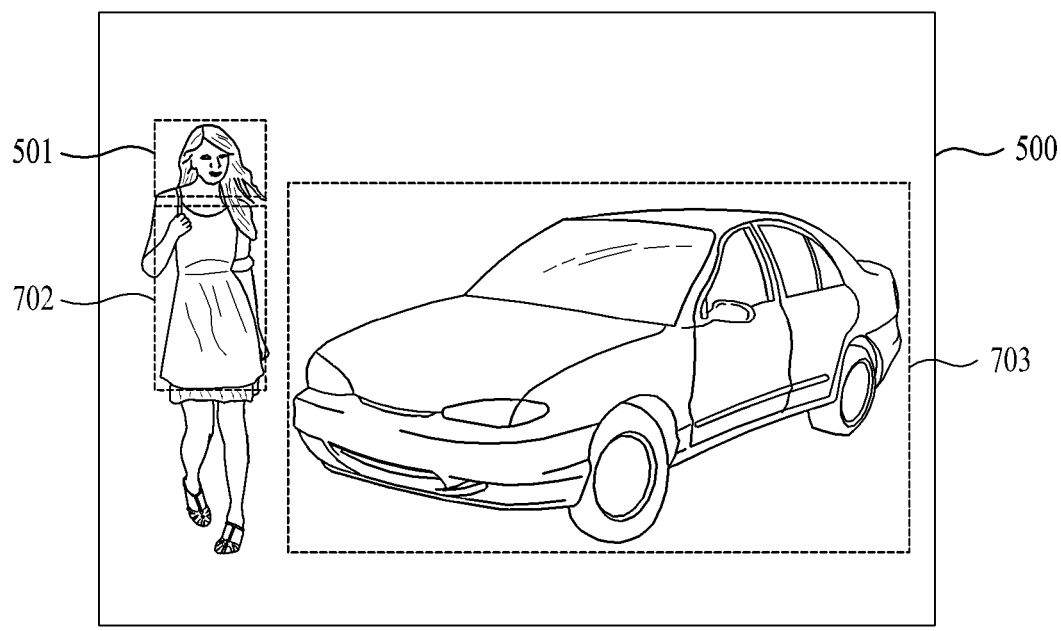
FIG. 7 illustrates an example of describing an object recognition process according to at least one example embodiment.

In operation 5430, the object recognizer 330 may recognize one or more objects associated with a specific person in the video frame based on the user likeability determined in operation 5420. The object recognizer 330 may determine whether a person liked by the user is recognized in the video frame based on the user likeability, and may determine whether an object is associated with the specific person based on a distance between the object and the specific person in an image or based on whether the specific person wears or overlaps the object. The object recognizer 330 may specify at least one person, for example, a person preferred or liked by a user based on the user likeability among persons recognized in the video frame and may recognize an object that appears together with the specified person. The object recognizer 330 may recognize the object that appears with the person in addition to the person in the video frame based on object recognition technology. Referring to FIG. 7, the object recognizer 330 may set object candidate areas 702 and 703 in the video frame 500 based on object recognition technology and may recognize an object in each of the object candidate areas 702 and 703. The object recognizer 330 may recognize at least one object that appears with the corresponding person through the object candidate areas 702 and 703 in association with the person recognized from the person candidate area 501 in the video frame 500. Likewise, the object recognizer 330 may track a change in a location of a specific object based on similarity of feature information, such as, for example, a size, a color, a shape, and/or an outline, between objects recognized in a series of video frames based on object tracking technology. An object recognition method may use at least one of an object recognition algorithm and/or an object tracking algorithm that are widely known. Similar to the person recognizer 310, the object recognizer 330 is based on an object detection and/or an object tracking. Here, although the person recognizer 310 and the object recognizer 330 are described as independent individual components, it is provided as an example only and they may be implemented as a single combined component.

In particular, the object recognizer 330 may automatically create a timestamp tag according to an object recognition by storing a timestamp of a video frame in which a corresponding object appears for each object recognized through the object recognition. According to at least one example embodiment, each timestamp may correspond to a time and/or duration (e.g., corresponding to a plurality of frames) in which a recognized object appears in the video. The timestamp tag may associate the timestamp with the recognized object. The object recognizer 330 may include one or more timestamp tags in a recognized object table stored on the electronic device 110 (see, e.g., FIG. 8). The object recognizer 330 may analyze at least one video frame included in a video and may store a corresponding object in association with each timestamp. Referring to FIG. 8, the object recognizer 330 may store a timestamp 840 in which a corresponding object 830 appears for each object 830 recognized in a video frame. As another example, the object recognizer 330 may specify and store the object 830 that appears in the video frame at a corresponding point in time for each timestamp 840. As another example, the object recognizer 330 may create a timestamp tag by additionally storing an object recognized with a corresponding person in a corresponding timestamp for each person stored by the person recognizer 310. According to at least one example embodiment, the person recognizer 310 may recognize a plurality of persons in a frame of a video, and the object recognizer 330 may recognize at least one object associated with each of the plurality of persons. The object recognizer 330 may include a timestamp tag for each recognized object corresponding to a recognized person in a recognized person and object table stored on the electronic device 110 (see, e.g., FIG. 9). Referring to FIG. 9, the object recognizer 330 may store the object 830 that appears with the person 610 in the same video frame, or a similar video frame, as the object 830 associated with the person 610 based on the timestamp 620 according to the person recognition. According to at least one example embodiment, the timestamp tags in the recognized person and object table may be grouped by recognized person. Therefore, the object recognizer 330 may automatically create a timestamp tag according to an object recognition using object recognition technology instead of specifying a time at which a specific object is displayed through a separate tool.

Referring again to FIG. 4, in operation 5440, the additional information provider 340 may provide additional information on the object recognized in operation 5430. The additional information provider 340 may provide additional information on a specific person and/or a specific object based on a timestamp tag according to a person recognition and an object recognition. Here, the additional information provider 340 may display the additional information on a video player through an overlay popup during a video playback or may display the additional information on a separate area present at a lower end of the video player. According to at least one example embodiment, the additional information provider 340 may generate a screen containing the additional information for output on a display (e.g., a display of the electronic device 110). The screen may include the additional information as the overlap popup or as the separate area at the lower end of the video player.

The additional information provider 340 may provide additional information based on person or object information preferred or liked by the user. For example, the additional information provider 340 may select an object associated with a person preferred or liked by the user from among objects recognized by the object recognizer 330 and may provide additional information on the selected object (e.g., by generating a screen containing the additional information on the selected object). Alternatively, the additional information provider 340 may distinguishably display the object associated with the person preferred or liked by the user among the objects recognized by the object recognizer 330, or may provide additional information only on the corresponding object and not on other objects in a video frame.

The additional information provider 340 may display additional information in association with a scene in which a specific person or a specific object appears based on a timestamp tag according to a person recognition and/or an object recognition. Here, the additional information provider 340 may display the additional information in association with a portion in which the specific person and/or the specific object is recognized in a video frame. According to at least one example embodiment, the additional information may be included in the screen (e.g., at a position or region of the screen) associated with the specific person and/or specific object. According to at least one example embodiment, the additional information and/or screen may be based on information included in the recognized person table, the recognized object table and/or the recognized person and object table. For example, the additional information provider 340 may display the additional information (e.g., the generated screen) on the video player at a point in time at which a first frame or a last frame in which the specific person and/or the specific object appears is displayed. As another example, if the specific person and/or the specific object continuously appears in a preset or alternatively, given number of frames, that is, if a frame section in which the specific person or the specific object is concentrated is displayed, the additional information provider 340 may maintain the additional information to be displayed. As another example, the additional information provider 340 may display the additional information in advance at a point in time at which a video frame before a preset or alternatively, given number of video frames based on a video frame in which the specific person or the specific object starts to appear is displayed. According to at least one example embodiment, the additional information provider 340 may output the generated screen at a time at which a video frame preceding a plurality of video frames, in which the specific person and/or object appears, is displayed. According to at least one example embodiment, the additional information provider 340 may output the generated screen at a time at which a video frame preceding a first video frame, among a plurality of video frames in which the specific person and/or object appears, by a preset or alternatively, given number of frames is displayed.

FIGS. 10 to 14 illustrate examples of a service screen for providing additional information according to at least one example embodiment.

Figure 10:
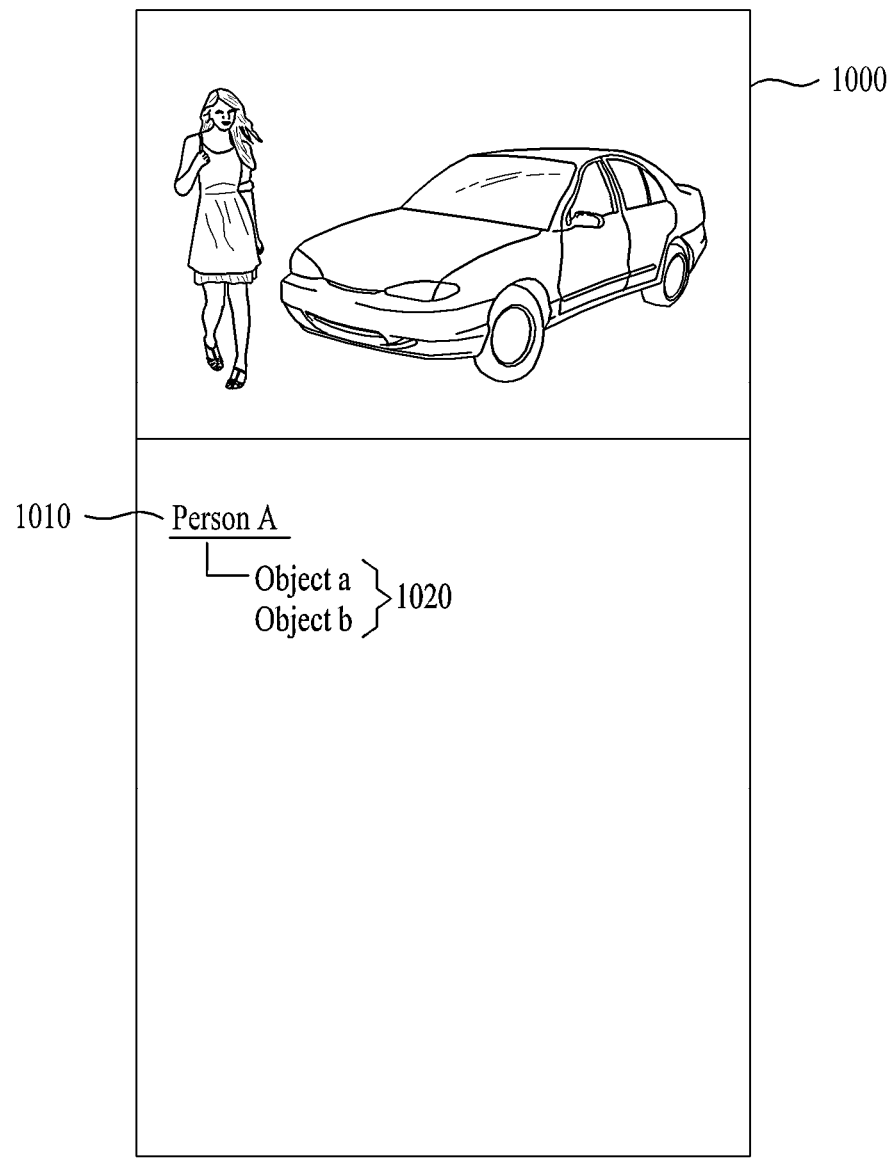
FIGS. 10 to 14 illustrate examples of a service screen that provides additional information according to at least one example embodiment.

Referring to FIG. 10, the additional information provider 340 may display a list of persons 1010 (e.g., one or more persons recognized by the person recognizer 310) and/or a list of objects 1020 (e.g., one or more objects recognized by the object recognizer 330) recognized in a video frame during a video playback at a lower end of a video player 1000. For example, the additional information provider 340 may provide the list of objects 1020 appearing with a corresponding person for each person included in the list of persons 1010. As another example, the additional information provider 340 may provide each of the list of persons 1010 and the list of objects 1020 as an individual list without association between a person and an object. For example, the additional information provider 340 may provide, as the list of objects 1020, clothes of a person A appearing in a video, a vehicle of the person A, and/or a mobile phone of the person A. Here, the list of persons 1010 and/or the list of objects 1020 may be provided with at least one thumbnail. The thumbnail may be an image extracted from a video frame in response to a person or an object being recognized by the person recognizer 310 or the object recognizer 330. In response to a selection of the user from the list of persons 1010 and/or the list of objects 1020, the additional information provider 340 may provide additional information on a specific person or a specific object corresponding to the selection of the user. While viewing a video through the video player 1000, the user may selectively consume additional information on a specific person that appears in the video being played back and/or additional information on a specific object that appears with the specific person. At least one example embodiment may provide for expanding a target to be consumed to not only the video being played back through the video player 1000 but also a person or an object appearing in the video.

The additional information provider 340 may provide additional information on a person specified based on a user selection or a user likeability among persons recognized in a video frame during a video playback by the video player 1000.

Figure 11:
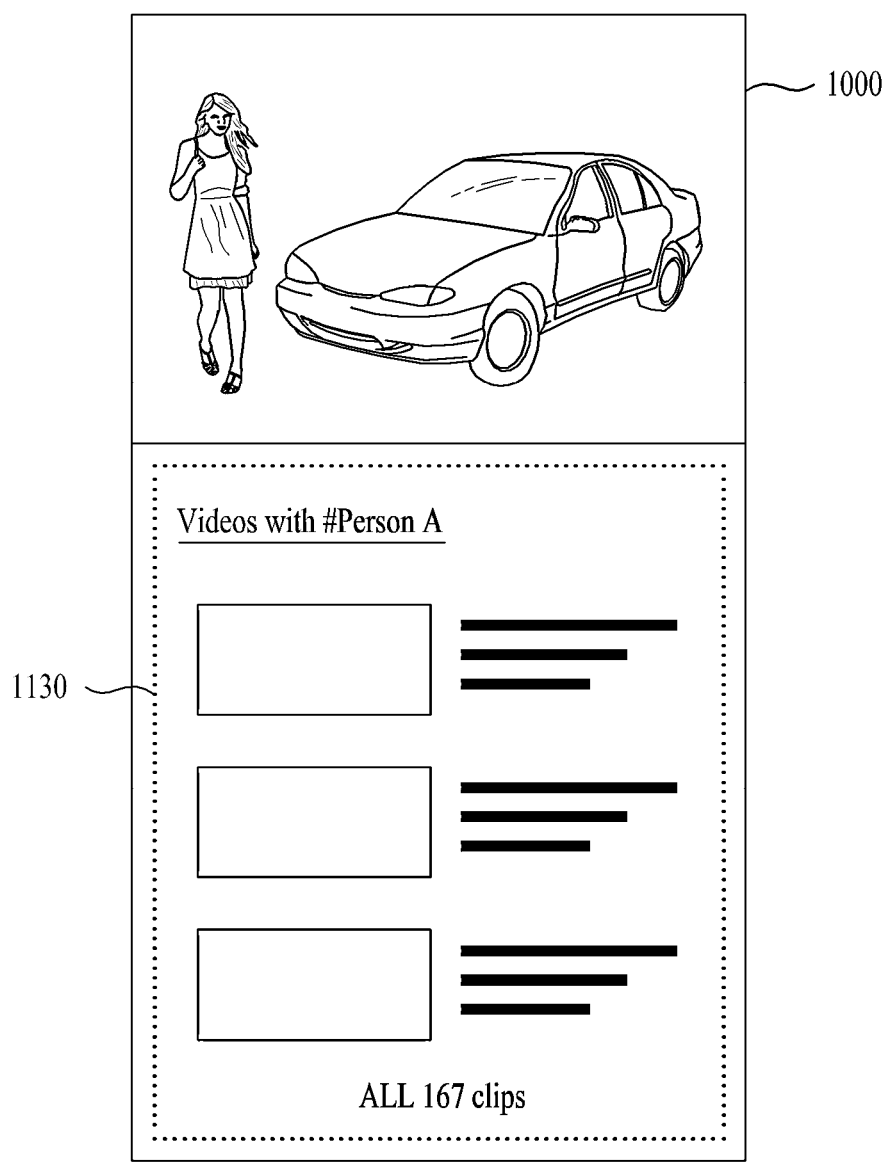

Referring to FIG. 11, the additional information provider 340 may display a list of video sections 1130 each in which a specific person appears at a lower end of the video player 1000 as an example of additional information on the specific person. The additional information provider 340 may provide the list of video sections 1130 by indicating a point at which the specific person appears using an indicator on a progress bar of the video player 1000. The additional information provider 340 may provide a scene jump function of jumping to a scene of a selection selected in response to a section selection using the list of video sections 1130. According to at least one example embodiment, the additional information provider 340 may cause the video player 1000 to play the video at a selected scene in response to receiving a selection of a scene included in the list of video selections 1130.

Figure 12:
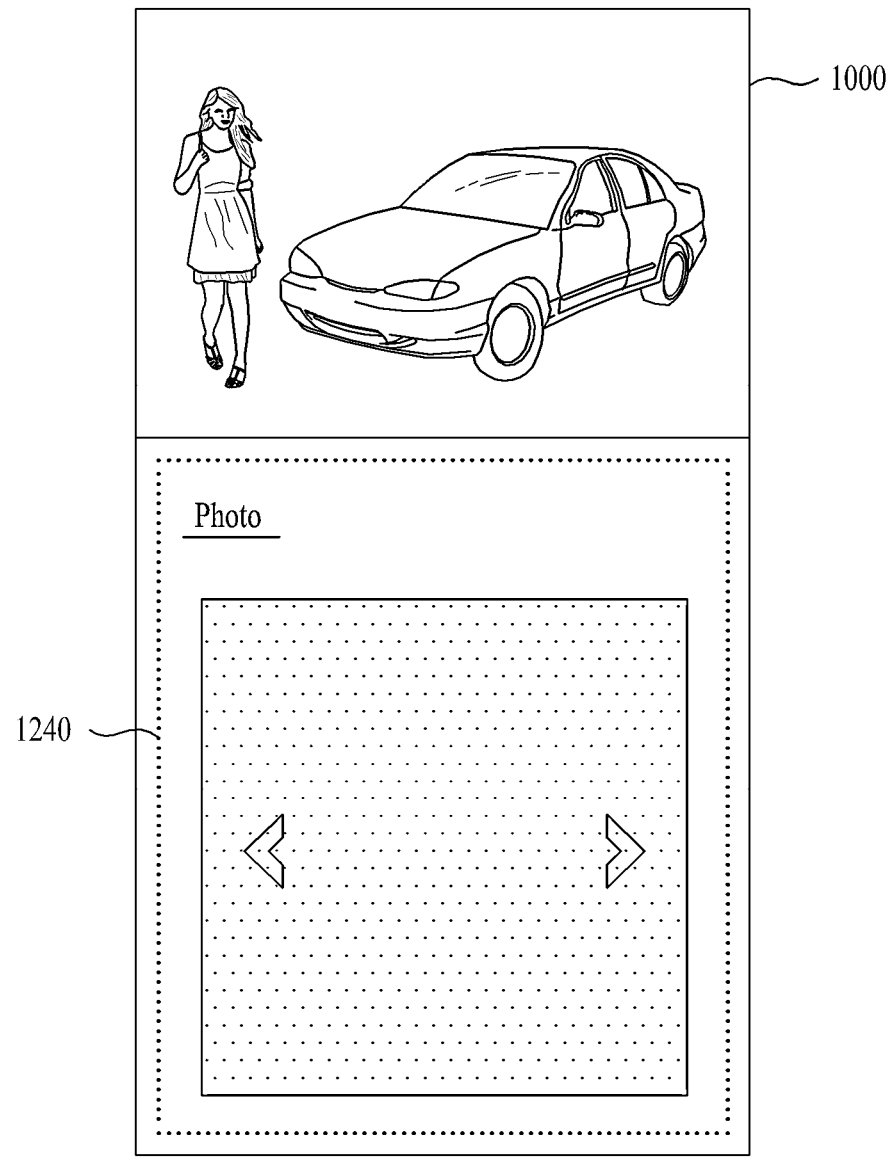

Referring to FIG. 12, the additional information provider 340 may display at least one photo 1240 associated with a specific person at a lower end of the video player 1000 as another example of additional information on the specific person. Here, the photo 1240 may include a scene in which the specific person appears in the video being played back through the video player 1000 or a photo of the specific person on the Internet through interaction with the server 150. The additional information provider 340 provides a function of retrieving and viewing a photo of the specific person as additional information on the specific person.

Figure 13:
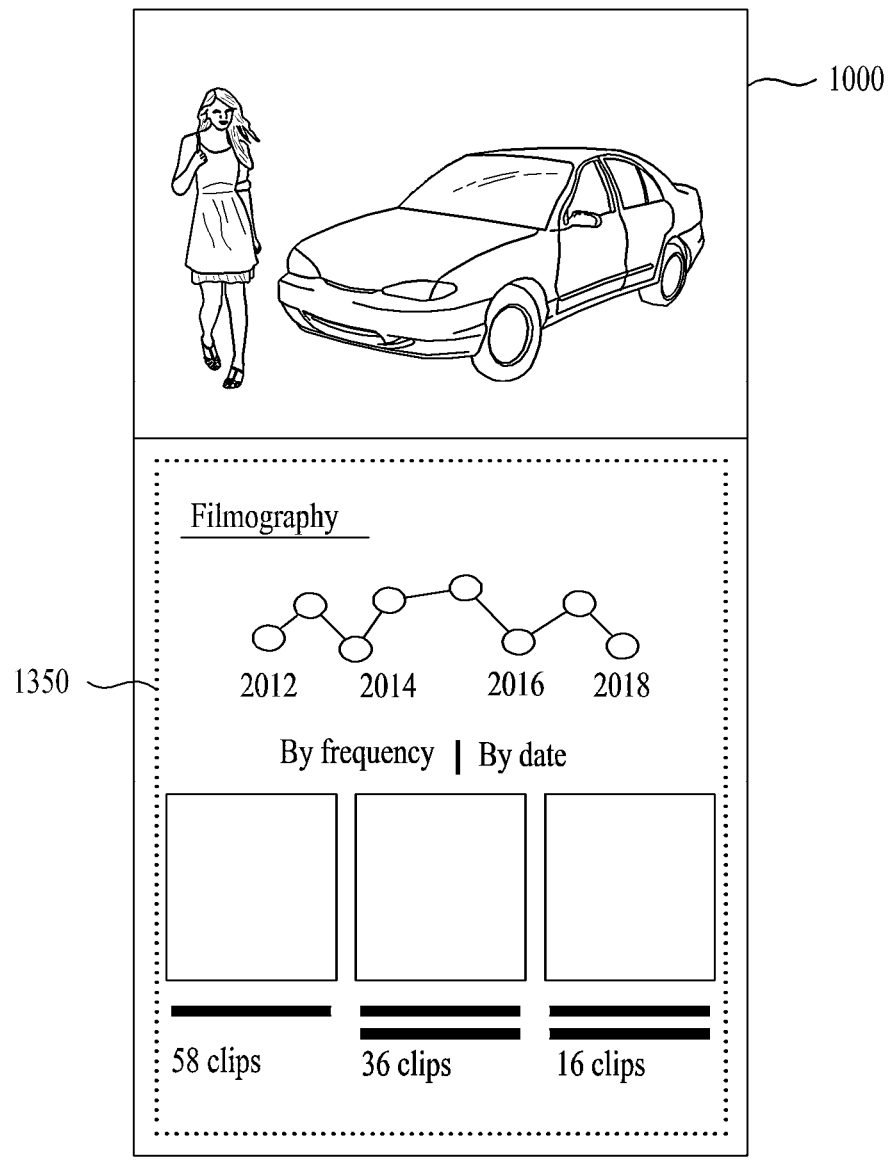

Referring to FIG. 13, the additional information provider 340 may display filmography 1350 of a specific person at a lower end of the video player 1000 as another example of additional information on the specific person. The additional information provider 340 may provide a list of works in which a person specified based on a user selection or a user likeability appears with a variety of statistical information. According to at least one example embodiment, the additional information provider 340 may output a list of works of the specific person on a display of the electronic device 110 in response to receiving a selection of the specific person. The additional information provider 340 provides a function of retrieving works of a specific person as additional information on the specific person.

Figure 14:
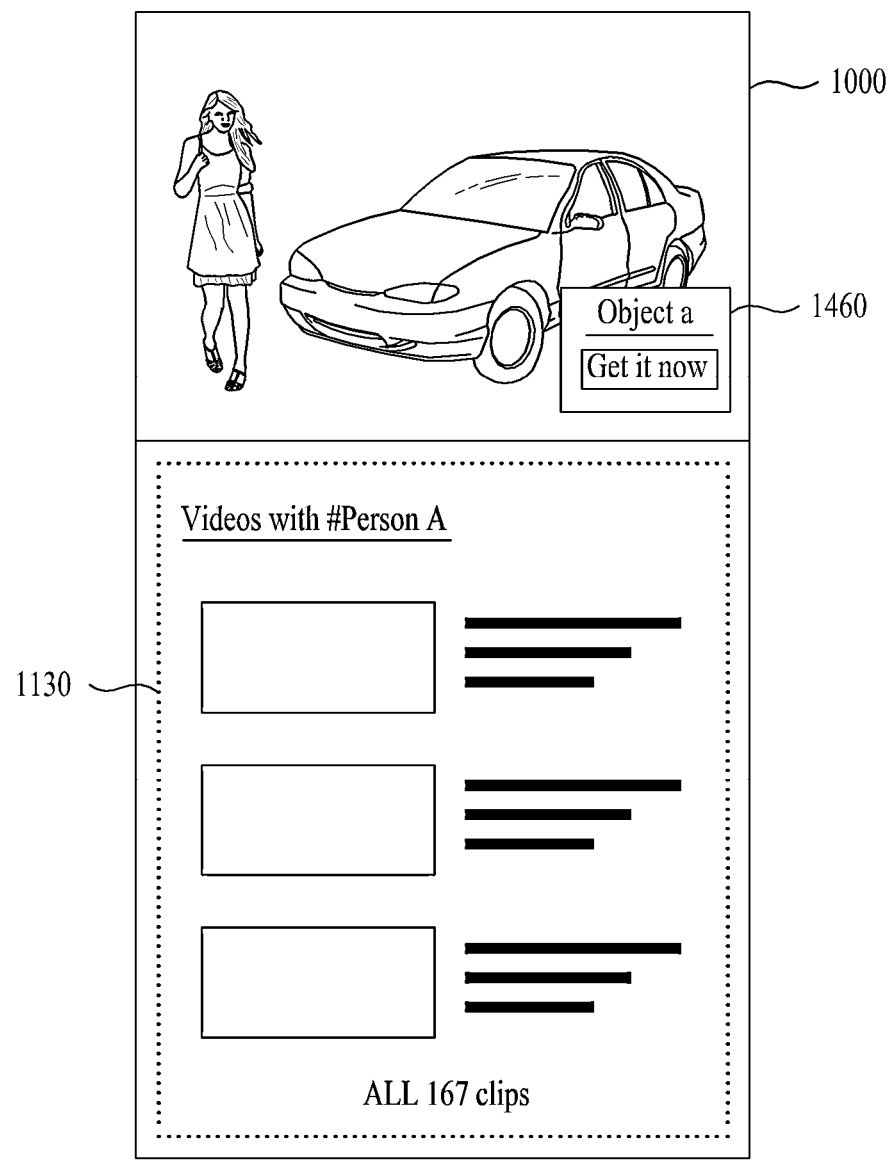

Referring to FIG. 14, the additional information provider 340 may display shopping information 1460 associated with a corresponding object as additional information on an object that appears with a specific person in a video being played back through the video player 1000. For example, the additional information provider 340 may provide a function of displaying the shopping information 1460 on the video player 1000 through an overlay popup (e.g., displayed nearby or on the corresponding object) such that a user may directly purchase a desired product using the function. The additional information provider 340 may match an object recognized through an object recognition to a pre-registered or registered corresponding PPL product and may display the shopping information 1460 including a page link at which the user may purchase the corresponding product as a popup layer. Here, the additional information provider 340 may display additional information on a specific person at a lower end of the video player 1000 and may provide the shopping information 1460 matched to an object that appears with the specific person as a popup on the video player 1000. As another example, the additional information provider 340 may retrieve an object recognized through an object recognition over the network 170 and may display the shopping information 1460 including a page link at which the user may purchase a corresponding product as a popup layer. According to at least one example embodiment, the additional information provider 340 may direct a user of the electronic device 110 to a purchase page (e.g., the additional information provider 340 may use a web browser installed on the electronic device 110 to retrieve the purchase page based on, e.g., a particular uniform resource locator address) of the corresponding product in response to receiving a selection of the shopping information 1460 (e.g., the page link).

In addition to a method of displaying the shopping information 1460 as a popup, in response to a direct selection from the user on a specific object in a video displayed on a screen of the video player 1000, the additional information provider 340 may couple a layer for receiving a user selection on an object on the video player 1000 to be directed to a purchase page of a product that is matched to the specific object. According to at least one example embodiment, the additional information provider 340 may direct a user of the electronic device 110 to a purchase page (e.g., the additional information provider 340 may use a web browser installed on the electronic device 110 to retrieve the purchase page based on, e.g., a particular uniform resource locator address) of the corresponding product in response to receiving a selection of the object on the video player 1000. As another example, each item of the list of objects 1020 of FIG. 10 may be configured in a form of a link to direct to a purchase page of a product that is matched to an object of a corresponding item.

As another example, the additional information provider 340 may provide a list of all of persons and a list of all of objects recognized in the entire video using a portion of frames of the video being played by the video player 1000, for example, a last frame of a section or a last frame of the video. Initially, a list of persons may be provided and, in response to a selection on at least one person from the list of persons, a list of objects associated with the selected person may be provided with each corresponding additional information.

The processor 212 may recognize a person and an object in a video being played back through the video player 1000 based on object recognition technology and object tracking technology and then may provide additional information on the person and also additional information on the object. In particular, the processor 212 may specify at least one person among persons recognized in the video based on a user likeability and then may provide shopping information that is matched to the object appearing with the specific person as the object associated with the specified person.

Although shopping information is described as additional information on an object, it is provided as an example only. The shopping information may include integrated search results about the object, content related to a video or an image, and map information.

According to at least one example embodiment, it is possible to experience a further interesting viewing environment and to easily retrieve more information on a person or an object that appears in a video while viewing a video by expanding a target to be consumed through a video player to another element, such as a person or an object in the video as well as the video.

Conventional devices and methods for providing additional information regarding objects in a video register timestamps in which the objects appear. However, the conventional devices and methods do not limit the registration of timestamps to objects associated with persons liked by a particular user. Accordingly, the conventional devices and methods use excessive resources (e.g., processor, memory, power, delay, etc.) by registering timestamps of undesired objects, and increase the difficulty of retrieving additional information regarding an object of interest by providing the user an excessively large list of objects.

However, according to at least one example embodiment, improved devices and methods are described for providing additional information regarding objects in a video. The improved devices and methods recognize a person in a video liked by the user and recognize an object associated with the liked person. The improved devices and methods provide additional information associated with the recognized object associated with the liked person. Accordingly, the improved devices and methods provide additional information associated with objects likely to be of interest to the user without providing the excessively large list of objects provided by the conventional devices and methods. Thus, the improved devices and methods overcome the deficiencies of the conventional devices and methods to enable a user to more easily retrieve additional information regarding an object of interest while reducing resource consumption (e.g., processor, memory, power, delay, etc.) with respect to the conventional devices and methods.

According to at least one example embodiment, operations described herein as being performed by the electronic device 110, the processor 212, the person recognizer 310, the likeability determiner 320, the object recognizer 330, the additional information provider 340, the server 150 and/or the processor 222 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by Appstore that distributes applications or a site, a server, and the like that supplies and distributes other various types of software.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An additional information providing method performed by a computer apparatus comprising processing circuitry, the additional information providing method comprising:
   recognizing, by the processing circuitry, a plurality of persons in a frame of a video during playback of the video;
   determining, by the processing circuitry, a user likeability of each respective person among the plurality of persons based on a corresponding ratio of videos in which the respective person appears among videos previously viewed by a user;
   performing, by the processing circuitry, object recognition on an object associated with a specific person based on a distance between the object and the specific person, the specific person being specified among the plurality of persons based on the user likeability, and the object being in the frame;
   and
   generating, by the processing circuitry, a screen containing additional information corresponding to the object, wherein
   the object appears in a plurality of frames of the video, the plurality of frames including the frame; and
   the method further comprises outputting the screen at a point in time at which a particular frame of the video is displayed, the particular frame preceding the plurality of frames by a number of frames.

2. The additional information providing method of claim 1, wherein the recognizing the plurality of persons comprises:
   setting a person candidate area in the frame; and
   recognizing the plurality of persons in the person candidate area.

3. The additional information providing method of claim 1, wherein the recognizing the plurality of persons comprises:
   creating a timestamp tag including storing a timestamp corresponding to a time in which each respective person among the plurality of persons appears.

4. The additional information providing method of claim 1, wherein the recognizing the object comprises:
   specifying at least one person among the plurality of persons based on the user likeability; and
   recognizing the object associated with the at least one person.

5. The additional information providing method of claim 1, further comprising:
   recognizing a plurality of objects associated with the specific person based on the user likeability, the object being one of the plurality of objects,
   wherein the recognizing the plurality of objects includes creating a timestamp tag including storing a timestamp corresponding to a time in which each respective object among the plurality of objects appears.

6. The additional information providing method of claim 1, wherein the determining the user likeability comprises determining the user likeability based on history information of the user, the user being a user of the computer apparatus, and the history information indicating an expressed interest in a particular person.

7. The additional information providing method of claim 1, wherein the additional information is included in the screen in association with a portion of the frame containing the object.

8. The additional information providing method of claim 1, further comprising:

recognizing a plurality of objects associated with the plurality of persons based on the user likeability, the object being one of the plurality of objects, wherein the additional information includes a list of the plurality of persons and a list of the plurality of objects, each object in the list of the plurality of objects appearing in the frame with a corresponding person in the list of the plurality of persons.

9. A non-transitory computer-readable record medium storing instructions that, when executed by processing circuitry, cause the processing circuitry to perform the additional information providing method of claim 1.

10. The additional information providing method of claim 1, further comprising:

extracting a thumbnail image from the frame in response to the recognizing the object, the thumbnail image corresponding to the object, wherein the additional information includes a list of objects and the thumbnail image, the list of objects including the object.

11. The additional information providing method of claim 1, wherein the performing object recognition includes:

setting an object candidate area in association with the specific person, the object candidate area being an area of the frame smaller than an entirety of the frame, and recognizing the object based on the object being in the object candidate area.

12. The additional information providing method of claim 11, further comprising:

determining that the object is associated with the specific person based on the distance between the object and the specific person in the frame, wherein the setting the object candidate area includes setting the object candidate area in response to the determining that the object is associated with the specific person.

13. The additional information providing method of claim 1, wherein the additional information includes shopping information of a product that is matched to the object and wherein the screen is to be displayed with a list of video sections of the video each in which the specific person appears.

14. A computer apparatus comprising:

processing circuitry configured to cause the computer apparatus to, recognize a plurality of persons in a frame of a video during playback of the video;

determine a user likeability of each respective person among the plurality of persons based on a corresponding ratio of videos in which the respective person appears among videos previously viewed by a user;

perform object recognition on an object associated with a specific person based on a distance between the object and the specific person, the specific person being specified among the plurality of persons based on the user likeability, the object being in the frame; and generate a screen containing additional information corresponding to the object, wherein the object appears in a plurality of frames of the video, the plurality of frames including the frame; and wherein the processing circuitry is configured to cause the computer apparatus to output the screen at a point in time at which a particular frame of the video is displayed, the particular frame preceding the plurality of frames by a number of frames.

15. The computer apparatus of claim 14, wherein the processing circuitry configured to cause the computer apparatus to:

set a person candidate area in the frame;

recognize the plurality of persons in the person candidate area; and create a timestamp tag including storing a timestamp corresponding to a time in which each respective person among the plurality of persons appears.

16. The computer apparatus of claim 14, wherein the processing circuitry configured to cause the computer apparatus to:

recognize a plurality of objects associated with the specific person based on the user likeability, the object being one of the plurality of objects;

recognize each of the plurality of objects in an object candidate area set in association with the specific person; and create a timestamp tag including storing a timestamp corresponding to a time in which each respective object among the plurality of objects appears.

17. The computer apparatus of claim 14, wherein the processing circuitry configured to cause the computer apparatus to:

specify at least one person among the plurality of persons based on the user likeability; and recognize the object associated with the at least one person.

18. The computer apparatus of claim 14, wherein the processing circuitry configured to cause the computer apparatus to determine the user likeability based on history information indicating that the user has expressed interest in a particular person, the user being a user of the computer apparatus.

* * * * *